United States Patent
Kralick (10) Patent No.: US 6,786,937 B2
(45) Date of Patent: Sep. 7, 2004

(54) SEALING METHOD AND APPARATUS FOR A FUEL CELL STACK

(75) Inventor: James H. Kralick, Albany, NY (US)

(73) Assignee: Plug Power Inc., Latham, NY (US)

(*) Notice: Subject to any disclaimer, the term of this patent is extended or adjusted under 35 U.S.C. 154(b) by 227 days.

(21) Appl. No.: 10/200,278

(22) Filed: Jul. 22, 2002

(65) Prior Publication Data

US 2002/0182471 A1 Dec. 5, 2002

Related U.S. Application Data

(62) Division of application No. 09/385,667, filed on Aug. 27, 1999, now Pat. No. 6,426,159.

(51) Int. Cl.$^7$ .............................. H01M 6/00; H01M 8/02

(52) U.S. Cl. ................... 29/623.2; 29/623.4; 29/623.1; 429/35; 429/26; 429/38; 429/36; 429/34; 429/39; 429/13

(58) Field of Search ................ 29/623.2, 623.4, 29/623.1; 429/13, 34, 26, 39, 35, 36

(56) References Cited

U.S. PATENT DOCUMENTS 5,776,624 A * 7/1998 Neutzler ..................... 429/26
6,149,810 A * 11/2000 Gonzalez-Martin et al. ..................... 210/321.84

* cited by examiner

*Primary Examiner*—Patrick Ryan
*Assistant Examiner*—Angela J. Martin
(74) *Attorney, Agent, or Firm*—Trop, Pruner & Hu, P.C.

(57) ABSTRACT

A fuel cell stack includes a stack of flow plates, a first gasket that is compatible with a coolant and a second gasket that is incompatible with the coolant. The stack of flow plates includes openings to form a coolant passageway that communicates the coolant and a reactant manifold passageway. The second gasket forms a seal around the reactant manifold passageway between an adjacent pair of the plates. The first gasket forms a seal around the coolant manifold passageway between the adjacent pair of plates. At least one region of a particular plate may be associated with a reactant flow, and this plate may include internal passageways that extend between manifold passageways to communicate a coolant. A seal that is substantially permanent isolates the internal passageways from the region(s) of the fuel cell plate that may be associated with reactant flow(s).

9 Claims, 7 Drawing Sheets

SEALING METHOD AND APPARATUS FOR A FUEL CELL STACK

This application is a divisional of U.S. Pat. Ser. No. 09/385,667, entitled, "Sealing Method and Apparatus for a Fuel Cell Stack," filed on Aug. 27, 1999 now U.S. Pat. No. 6,426,159.

BACKGROUND

The invention generally relates to a method and apparatus for sealing a fuel cell stack, and more particularly, the invention relates to sealing off regions of the stack that are associated with a coolant flow.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

$H_2 \rightarrow 2H^+ + 2e^-$ at the anode of the cell, and $O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different flow plates that are stacked one on top of the other in the appropriate order, and each plate may be associated with more than one fuel cell of the stack. The plates may be made from a graphite composite or metal material and may include various flow channels and orifices to, as examples, route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example.

Figure 1:
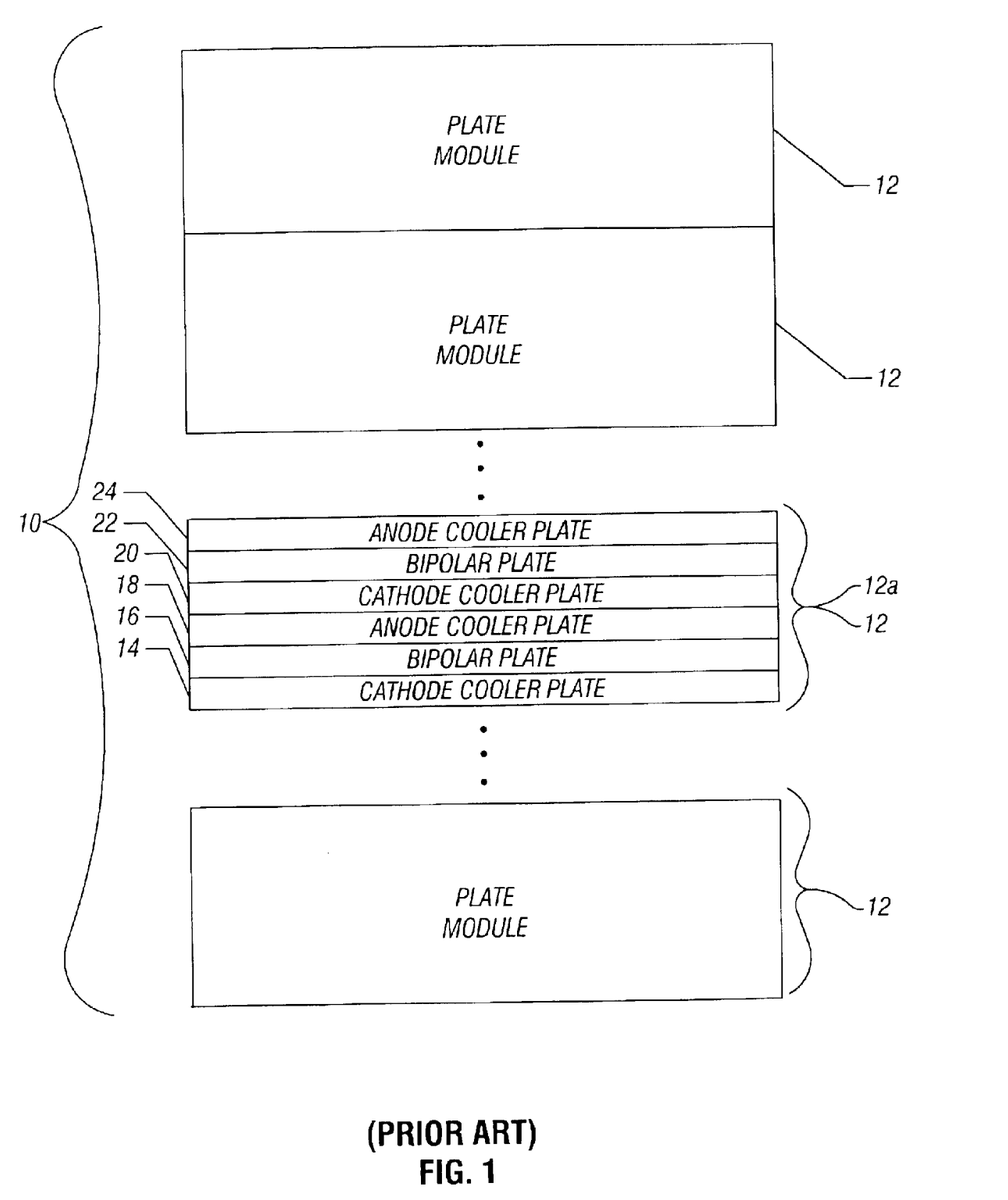
FIG. 1 is a schematic diagram illustrating a fuel cell stack according to the prior art.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bipolar plate 16, a cathode cooler plate 18, an anode cooler plate 20, a bipolar plate 22 and an anode cooler plate 24 that are stacked from bottom to top in the listed order. The cooler plate functions as a heat exchanger by routing a coolant through flow channels in either the upper or lower surface of the cooler plate to remove heat from the plate module 12a. The surface of the cooler plate that is not used to route the coolant includes flow channels to communicate either hydrogen (for the anode cooler plates 18 and 24) or air (that provides the oxygen for the cathode cooler plates 14 and 20) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an anode-membrane-cathode sandwich, called a membrane-electrode-assembly (MEA), that is located between the anode cooler plate 24 and the bipolar plate 22. In this manner, upper surface of the bipolar plate 22 includes flow channels to communicate oxygen near the cathode of the MEA, and the lower surface of the anode cooler plate 24 includes flow channels to communicate hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to communicate hydrogen near the anode of the MEA, and the upper surface of the cathode cooler plate 20 includes flow channels to communicate air near the cathode of the MEA. The other fuel cells of the plate module 12a may be formed in a similar manner.

To communicate the hydrogen, oxygen and coolant through the stack, the plates include openings that align to form passageways of a manifold. The fuel cell stack typically includes gaskets to seal off the various manifold passageways and flow channels. Unfortunately, the gaskets may significantly contribute to the overall cost of the fuel cell stack.

SUMMARY

In an embodiment of the invention, a fuel cell stack includes a stack of flow plates, a first gasket that is compatible with a coolant and a second gasket that is incompatible with the coolant. The stack of flow plates includes openings to form a coolant passageway that communicates the coolant and a reactant manifold passageway. The second gasket forms a seal around the reactant manifold passageway between an adjacent pair of the plates. The first gasket forms a seal around the coolant manifold passageway between the adjacent pair of plates.

In another embodiment of the invention, an apparatus includes a fuel cell plate that includes at least one region that is associated with a reactant flow. The fuel cell plate includes internal passageways that extend between manifold passageways to communicate a coolant. A seal that is substantially permanent isolates the internal passageways from the region(s) of the fuel cell plate that may be associated with reactant flow(s).

Advantages and other features of the invention will become apparent from the following description, from the drawing and from the claims.

DETAILED DESCRIPTION

Figure 2:
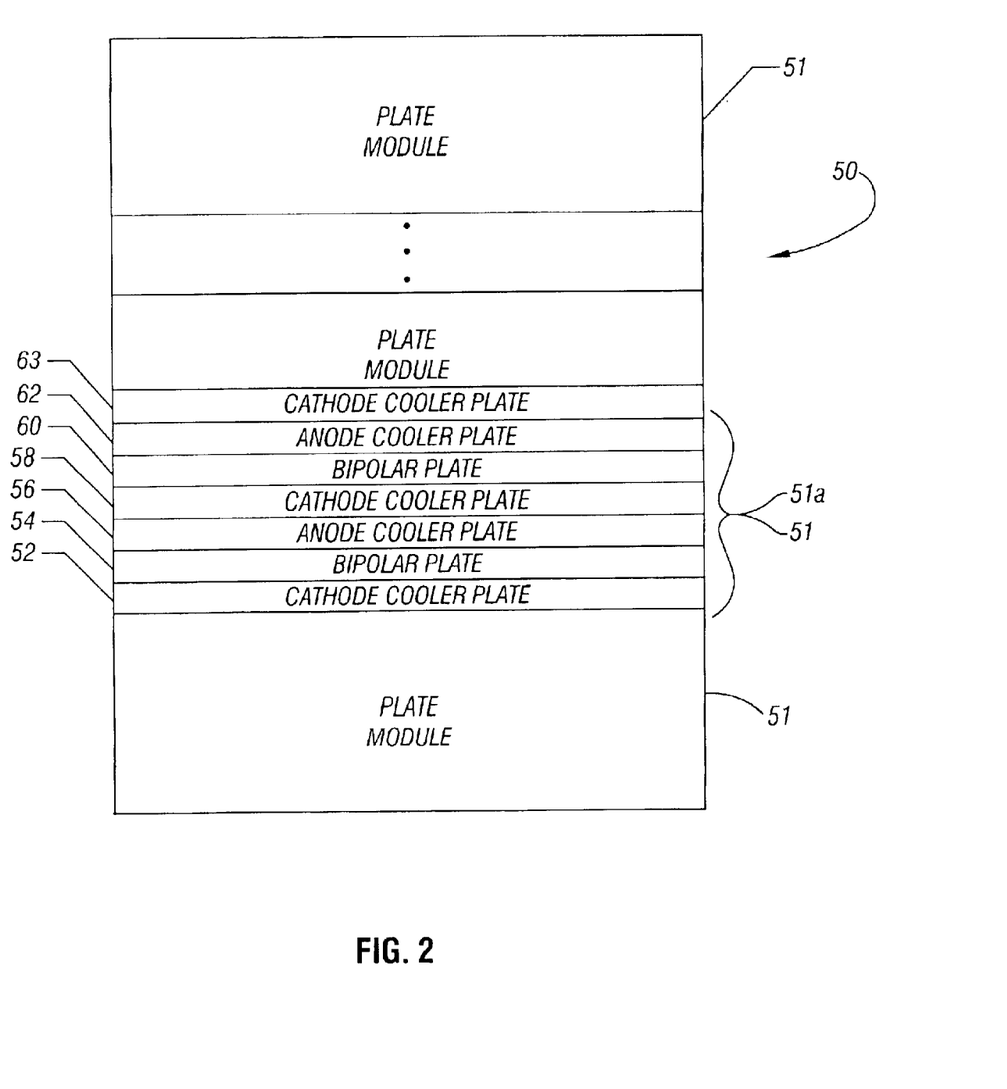
FIG. 2 is a side view of a fuel cell stack according to an embodiment of the invention.

Referring to FIG. 2, an embodiment 50 of a fuel cell stack in accordance with the invention may be formed from repeating units called plate modules 51. An exemplary plate module 51a (having a design similar to the other plate modules 51) includes flow plates (graphite composite or metal plates, for example) that include flow channels to form several fuel cells. The flow plates also include aligned openings to form passageways of a manifold that communicates reactants and a coolant (a coolant that includes Therminol D-12® that is made by Solutia Inc.; HFE-7100 ($C_4F_9OCH_3$), a hydroflouroether that is made by 3M Corporation; HFE-7200 ($C_4F_9OC_2H_5$), another hydroflouroether that is made by 3M Corporation; or a mixture that includes one or more of these fluids, as examples) with the stack 50. As an example, the plate module 51a may include the following flow plates: bipolar plates 54 and 60; cathode cooler plates 52 and 58; and anode cooler plates 56 and 62.

Figure 3:
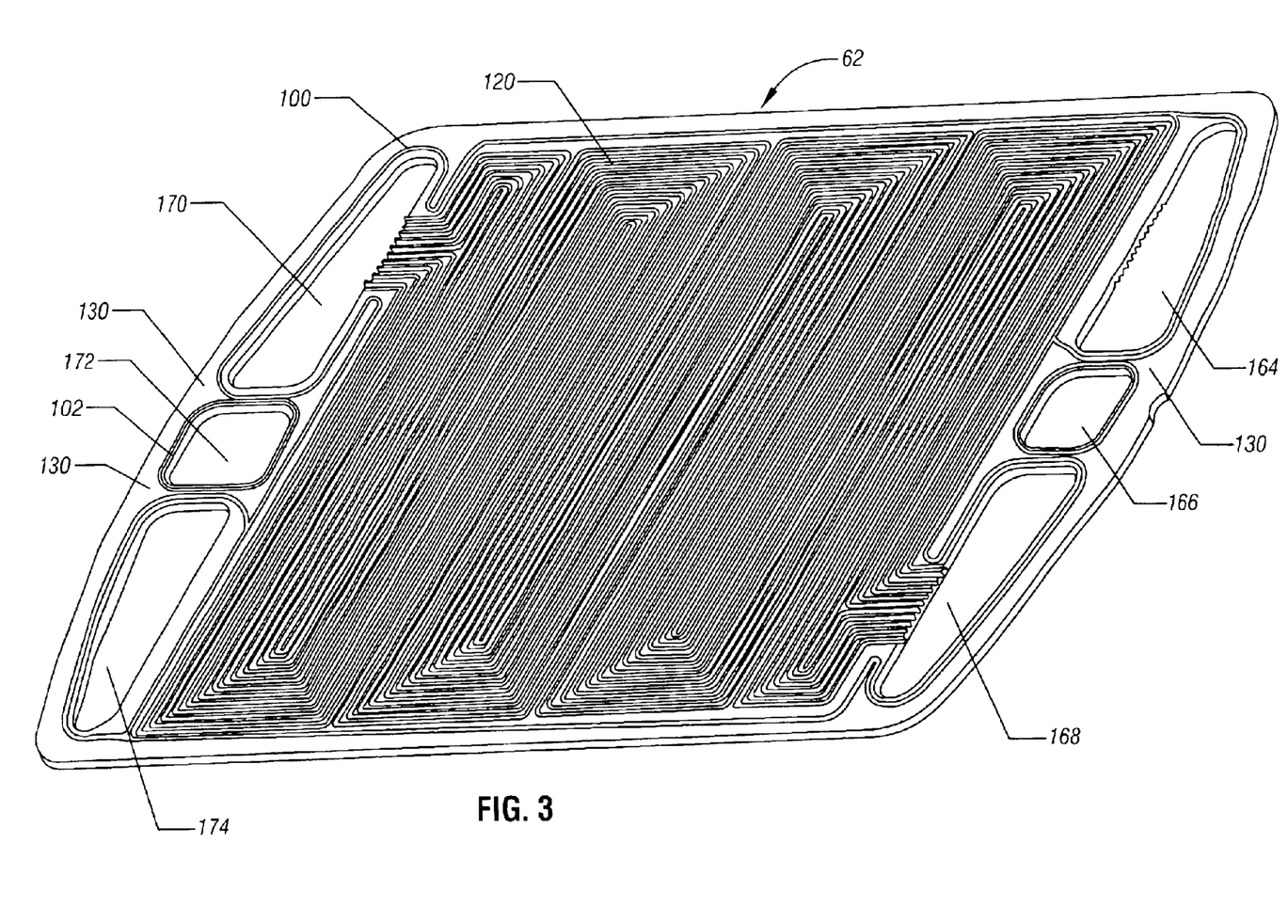
FIG. 3 is a bottom view of an anode cooler plate and a gasket of the fuel cell stack of FIG. 2 according to an embodiment of the invention.

Referring also to FIG. 3 that depicts a bottom view of the anode cooler plate 62, the anode cooler plate 62 includes openings that partially form the manifold for communicating the reactants and the coolant. In this manner, the anode cooler plate 62 may include an opening 170 to form part of a vertical inlet passageway of the manifold for communicating hydrogen to the fuel cell stack 50; and the anode cooler plate 62 may include an opening 168 to form part of a vertical outlet passageway of the manifold for removing unconsumed hydrogen from the fuel cell stack 50. Similarly, openings 174 and 164 in the anode cooler plate 62 may form partial vertical inlet and outlet passageways, respectively, of the manifold for communicating air (to deliver oxygen to the fuel cells of the stack 50); and openings 172 and 166 in the anode cooler plate 62 may form partial vertical inlet and outlet passageways, respectively, of the manifold for communicating the coolant.

Between the anode cooler plate 62 and the lower adjacent bipolar plate 60 (see FIG. 2), regions are established that are associated with the air, hydrogen and coolant flows. For example, the openings 172 and 166 create regions that are associated with the coolant flow, and the openings 174 and 164 create regions that are associated with the air flow. The bottom surface of the anode cooler plate 62 includes serpentine flow channels 120 that communicate hydrogen between the openings 170 and 168 to a gas diffusion layer (not shown) that is located between the anode cooler plate 62 and the bipolar plate 60.

To seal off the various regions that are associated with the different reactant and coolant flows, a conventional fuel cell stack may use a single gasket between the anode cooler plate 62 and the bipolar plate 60. However, using a single gasket requires that the material that is used to form the gasket is compatible with all of the reactants and coolants. For example, a particular gasket material may be compatible with hydrogen and air, but the gasket may be incompatible with the coolant, an incompatibility that requires use of another gasket material. As an example, the coolant may tend to dissolve or erode an incompatible gasket material. Unfortunately, a gasket material that is compatible with all of the reactants and coolants may be quite expensive.

Unlike conventional arrangements, the fuel cell stack 50 includes two type of gaskets to seal off regions between two adjacent flow plates. In this manner, relatively small gaskets 102 (shown in FIG. 3) that are formed from a coolant compatible material are used to seal off the coolant openings 172 and 166; and a larger gasket 100 that may be incompatible with the coolant (but compatible with the hydrogen and air flows) is used to seal off the flow channels 120 and the reactant openings 164, 168, 170 and 174. Because the material that forms the gasket 102 may be more expensive than the material that forms the gaskets 100, the cost associated with sealing the anode cooler plate 62 and bipolar plate 60 together may be substantially reduced, as compared to conventional arrangements. Similar seal arrangements may be used to seal other anode cooler plates and bipolar plates together and seal cathode cooler and bipolar plates together. Therefore, the cost savings of such an arrangement may be substantial when considering the large number of gaskets (on the order of one hundred, for example) that are used in a fuel cell stack.

As depicted in FIG. 3, each gasket 102 is relatively small compared to the larger gasket 100, and each gasket 102 may closely circumscribe its associated coolant manifold passageway opening 166, 172 to form a sealed region around the opening 166, 172. The gasket 100 is substantially larger than either of the gaskets 102 and closely circumscribes each air manifold passageway opening 164, 174 to form a sealed region around the opening. The gasket 100 also closely circumscribes a region that includes the hydrogen manifold passageway openings 168 and 170 and the flow channels 120.

Due to the use of the separate gaskets 100 and 102, a buffer zone 130 is established between the sealed regions that contain the coolant and the sealed regions that contain the reactants. In this manner, the buffer zone 130 is not a sealed region, and any coolant that leaks outside of the gasket 102 enters the buffer zone 130. Because the pressure in the sealed regions that are formed by the gasket 100 is generally greater than the atmospheric pressure of the buffer zone 130, any coolant that leaks into the buffer zone 130 does not leak into the reactant manifold passageways. Otherwise, if the coolant enters a reactant manifold passageway, the coolant may permanently damage the membranes (proton exchange membranes (PEMs), for example) of the fuel cell stack 50. If the fuel cell stack 50 is mounted in a different orientation (tilted by about 90°, for example) than the vertical orientation depicted in FIG. 2, then any coolant in the buffer zone 130 may drain out of the fuel cell stack 50.

Although FIG. 3 depicts the use of the gaskets 100 and 102 with the anode cooler plate 62, the gaskets 100 and 102 may be used in a similar manner to seal coolant and reactant regions that are associated with other anode cooler plates of the stack 50 and other cathode cooler plates (such as cathode cooler plates 52 and 58, as examples).

In some embodiments, each gasket 100 and 102 may have an O-ring cross-sectional profile. However, other cross-sectional profiles may be used. In some embodiments, the gasket 100 may be made from a buna-n, silicone, or a nitrile material and may be obtained from Parker O-Ring in Lexington, Ky. In some embodiments, the gasket 102 may be made from a viton, fourosilicone or flourocarbon material and may be obtained from Parker O-Ring. The gasket 100 or 102, in some embodiments, may be a composite gasket or a coated gasket, as can be appreciated by those skilled in the art.

In some embodiments each gasket 100, 102 may reside in an associated gasket groove that is formed in the top surface of the bipolar plate (when the gasket 100, 102 is between a bipolar plate and an anode cooler plate) or a cathode plate (when the gasket 100, 102 is between a cathode plate and a bipolar plate).

The gaskets 100 and 102 are not permanent seals in the sense that compression on the fuel cell stack 50 may be released to permit the gasket 100, 102 to be replaced or to permit replacement of a flow plate or PEM, as examples. Thus, if necessary, the compression on the stack 50 may be released to permit the separation of pairs of adjacent bipolar and cooler plates to service different parts of the stack 50. However, in some embodiments, a substantially permanent seal may be formed between adjacent cooler plates. The use of this substantially permanent seal, in turn, permits a less expensive and more reliable seal to be used to seal off the coolant flows between adjacent coolant plates.

Figure 4:
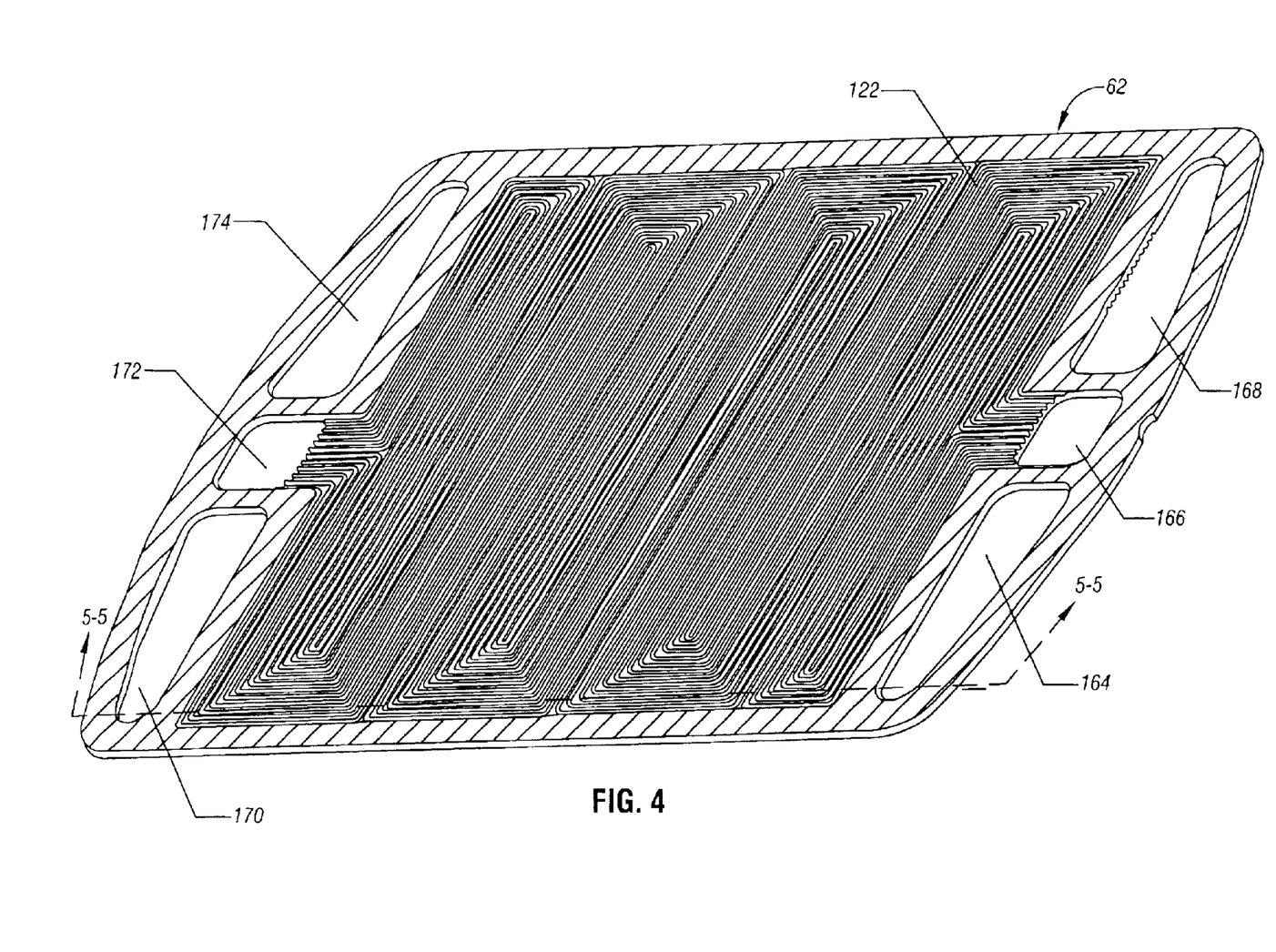
FIG. 4 is a top view of a cathode cooler plate of the fuel cell stack of FIG. 2 according to an embodiment of the invention.

For example, referring to FIG. 4, the upper surface of the anode cooler plate 62 includes coolant flow channels 122 that extend between the coolant openings 166 and 172 of the plate 62, and the lower surface of an upper adjacent cathode cooler plate 63 (see FIG. 3) includes coolant flow channels that mirror the flow channels 122. A region 136 on the upper surface of the anode cooler plate 62 surrounds the coolant flow channels 122 and the reactant manifold passageway openings 164, 168, 170 and 174 of the plate 62. A region similar to the region 136 exists on the lower surface of the upper adjacent cathode cooler plate 63.

In some embodiments, a substantially permanent seal is formed between two adjacent anode cooler and cathode cooler plates by applying a bonding agent to the regions that surround the reactant and coolant regions (such as the region 136 that is depicted in FIG. 4) of the plates to bond the surfaces that include the coolant flow channels together. For example, referring to FIG. 5, the anode cooler plate 62 may be bonded to an upper adjacent cathode cooler plate 63 (see FIG. 2) to form a cooler plate 300 that is depicted in a cross-sectional view in FIG. 6. The bonding agent forms a substantially permanent seal to seal off the regions (between the plates 62 and 63) that are associated with the reactant and coolant flows.

As examples, the bonding agent may be an epoxy compound, and if the plates 62 and 63 are metal (stainless steel, for example) plates, the bonding agent may be a brazing compound. In this manner, the brazing compound may be brushed on the region 136, the plates 62 and 63 subsequently may be mated together so that coolant flow channels 122 of the plate 62 align with coolant flow channels 138 of the plate 63, and then this assembly may be inserted into a furnace to heat the brazing compound to bond the plates 62 and 63 together.

Figure 5:
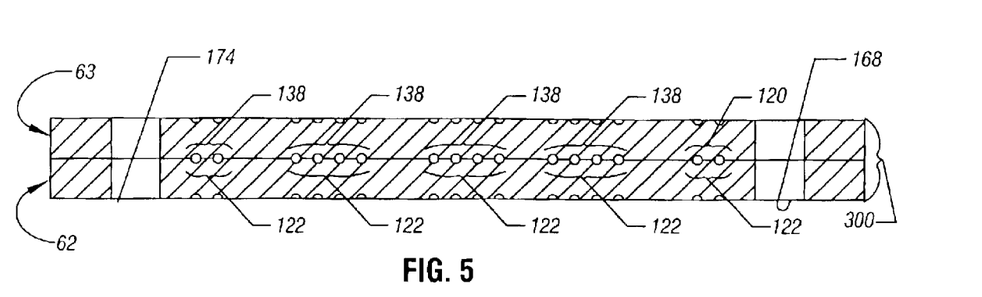
FIG. 5 is a cross-sectional view of the anode cooler plate and the cathode cooler plate of the fuel cell stack taken along line 5—5 of FIG. 4.
Figure 6:
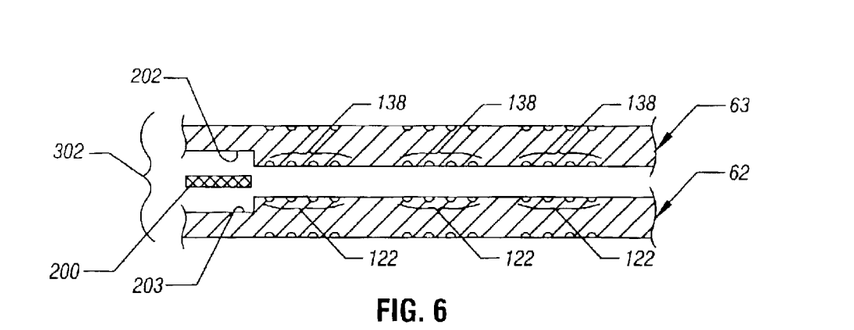
FIGS. 6 and 7 are more detailed cross-sectional views of the anode cooler plate and the cathode cooler plate according to different embodiments of the invention.

As depicted in FIG. 5, the flow channels 122 and 138 each form one half of internal coolant passageways that extend between the inlet and outlet coolant manifold passageways. Referring to FIG. 6, in a cooler plate 302, the plates 62 and 63 include recessed regions 202 and 203 to receive a bonding agent 200, an agent that may be, as example, a brazing compound or epoxy, as described above.

Figure 7:
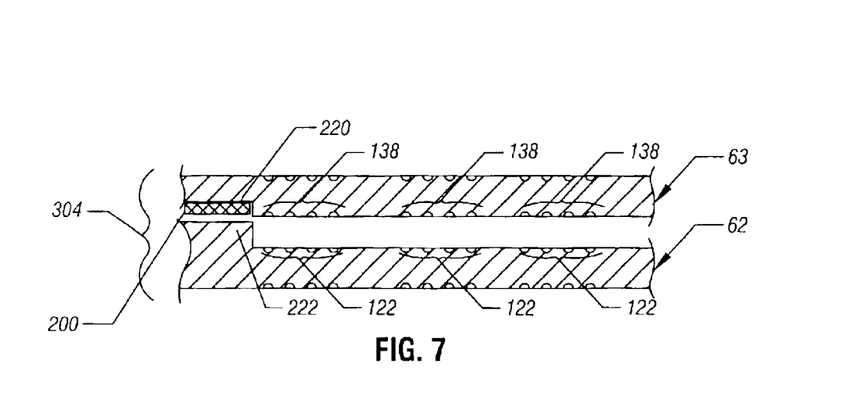

For purposes of aligning the plates 62 and 63 so that the flow channels 122 and 138 align, the plates 62 and 63 may include alignment holes (not shown) through which alignment pins (not shown) may be inserted to keep the plates 62 and 63 properly aligned. Referring to FIG. 7, alternatively, to form a cooler plate 304, the cathode cooler plate 63 includes a recessed region 220 that receives a mating shoulder 222 of the anode cooler plate 62 for purposes of aligning the flow channels 122 and 138.

Other anode and cathode cooler plates of the fuel cell stack 50 may be bonded together in a similar fashion.

Figure 8:
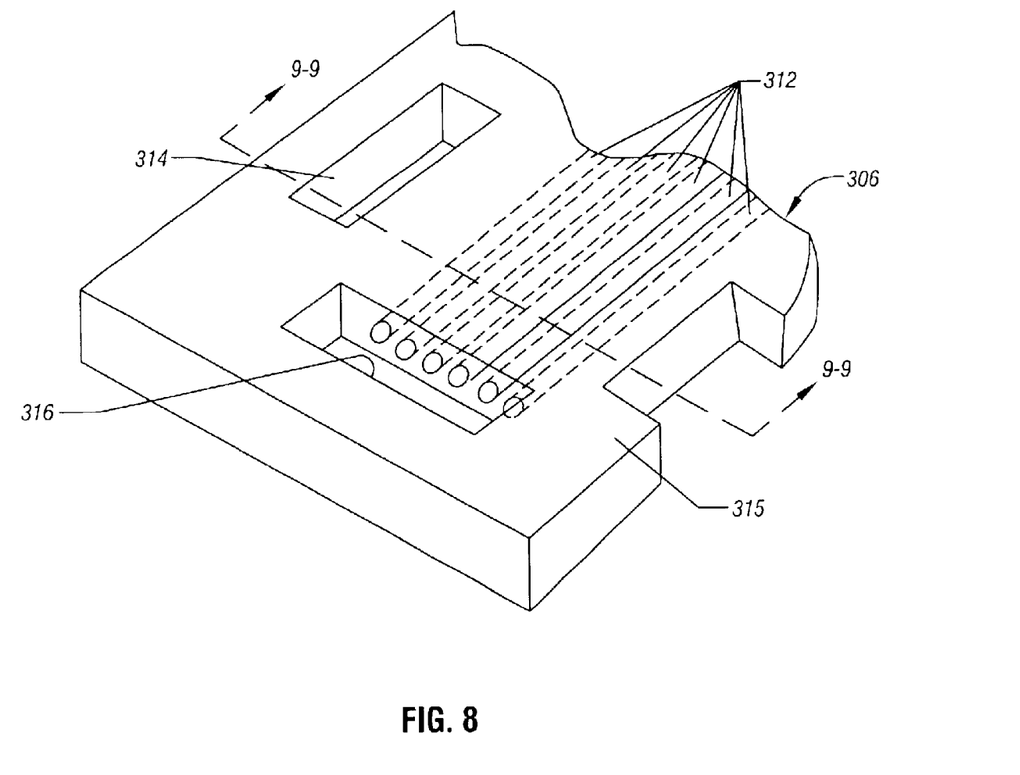
FIG. 8 is a perspective view of a cooler plate according to an embodiment of the invention.
Figure 9:
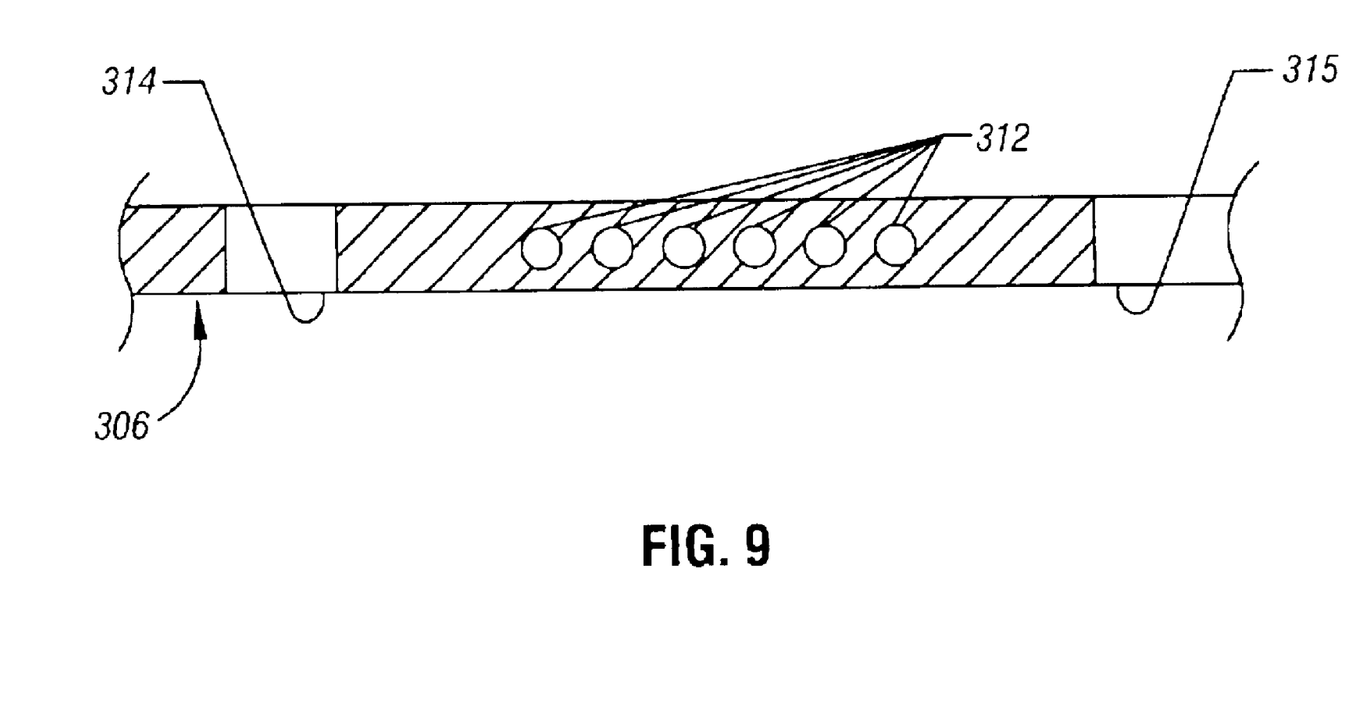
FIG. 9 is a cross-sectional view of the cooler plate taken along line 9—9 of FIG. 8.

Referring to FIG. 8, in some embodiments, a cooler plate 306 may be formed by encapsulating tubes 312 (metal tubes, for example) with an encapsulant (a graphite composite material, for example) via injection molding. In this manner, the tubes 312 extend between the coolant manifold passageways by extending between coolant inlet and outlet openings (such as an opening 316 of the plate 306) that form part of the coolant manifold passageways. The encapsulant that surrounds the tubes 312 forms a substantially permanent seal around the internal passageways that are established by the tubes 312, as depicted in a cross-sectional view of the cooler plate 306 in FIG. 9. The cooler plate 306 also includes openings (openings 314 and 315, as examples) for forming parts of reactant manifold passageways. The upper surface air flow channels of the cooler plate 306 are not shown in FIGS. 8 and 9.

In the preceding description, directional terms, such as "upper," "lower," "vertical," "horizontal," etc. may have been used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by approximately 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
arranging flow plates to form at least a part of a fuel cell stack, each of the flow plates including openings to form different manifold passageways for different fluid flows; and
forming buffer zones on each plate to isolate the different manifold passageways.

2. The method of claim 1, wherein the manifold passageways include at least one coolant passageway.

3. The method of claim 1, wherein the manifold passageways include at least one reactant passageway.

4. The method of claim 1, wherein the forming the buffer zones comprises:
using first gaskets to seal off regions that are associated with one of the manifold passageways, each first gasket having a first approximate sealing characteristic; and
using second gaskets to seal off other regions that are associated with another one of the manifold passageways, each second gasket having a second approximate sealing characteristic substantially different from the first approximate sealing characteristic.

5. A method comprising:
in a flow plate, forming internal passageways that extend between manifold passageways of a fuel cell stack to communicate a coolant; and
embedding the internal passageways within the flow plate to substantially permanently isolate the internal passageways from at least one region of the flow plate associated with a reactant flow.

6. The method of claim 5, further comprising:
using flow channels of two different flow plates to collectively form the internal passageways, and
applying a bonding agent permanently mount the first and second plates together.

7. The method of claim 5, wherein the forming comprises:
using injection molding to form the plate; and
using tubes to form the internal passageways.

8. The method of claim 1, wherein each buffer zone comprises a region of the plate capable of receiving leakage from at least one of the fluid flows.

9. The method of claim 1, further comprising:
isolating each of the manifold passageways with a gasket to form the buffer zones, each gasket being separate from the other gaskets.

* * * * *